United States Patent Office 3,298,302
Patented Jan. 17, 1967

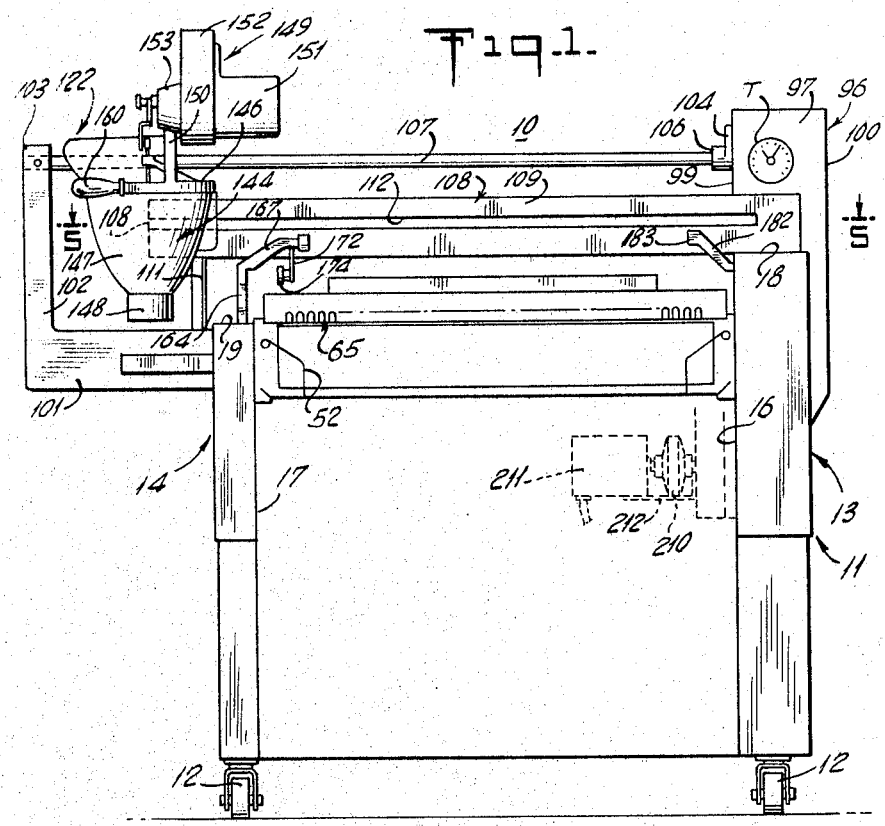
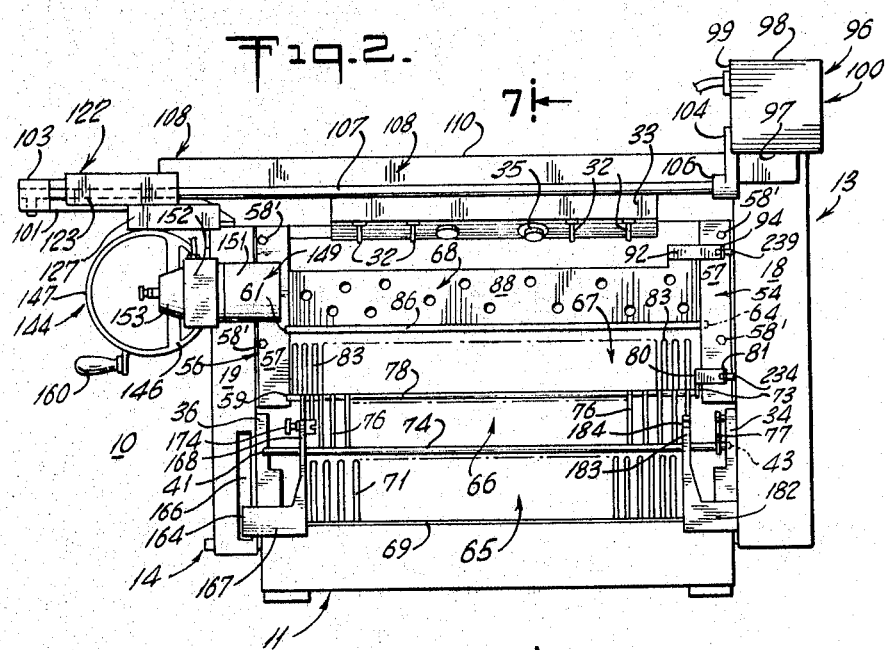

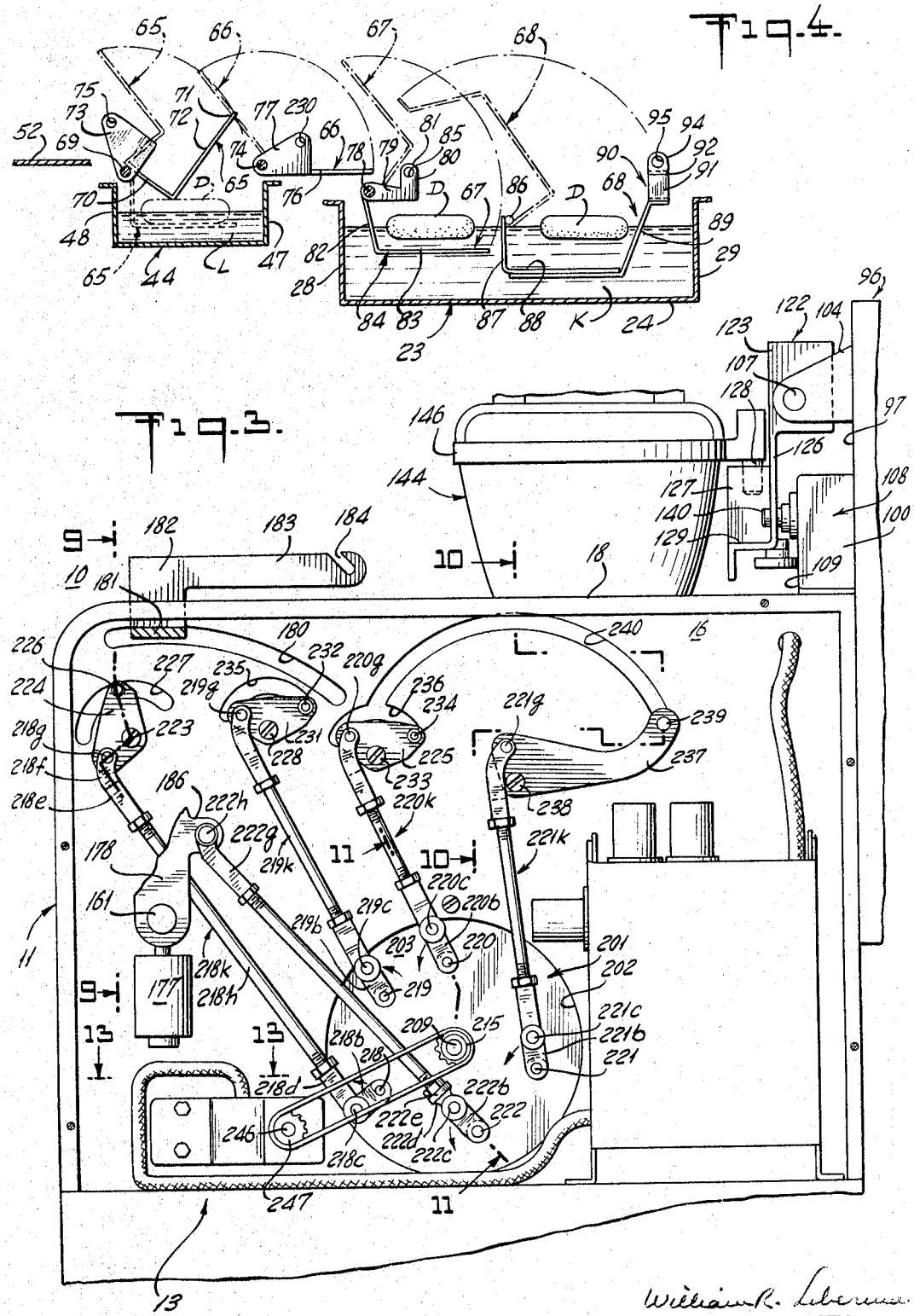

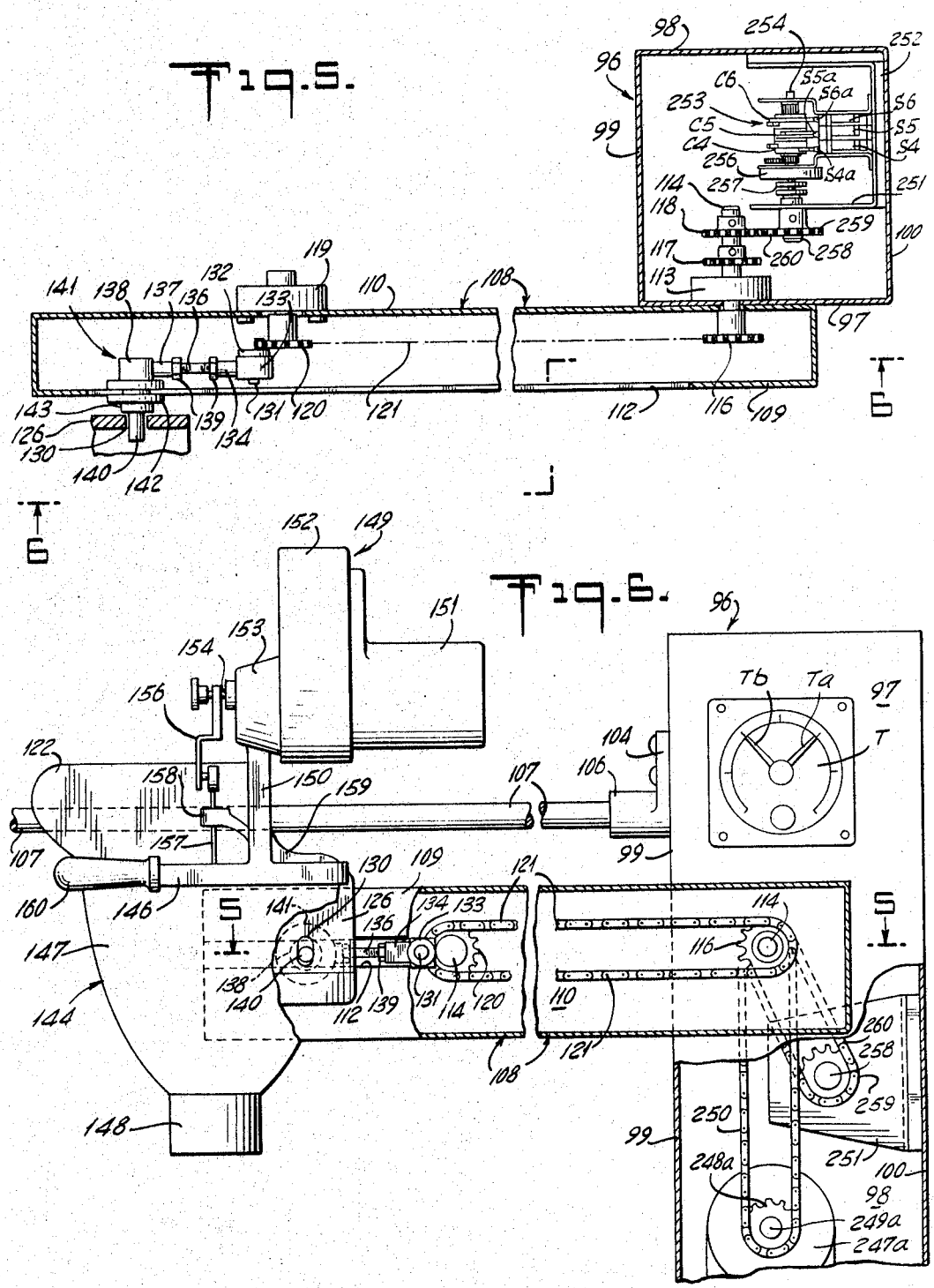

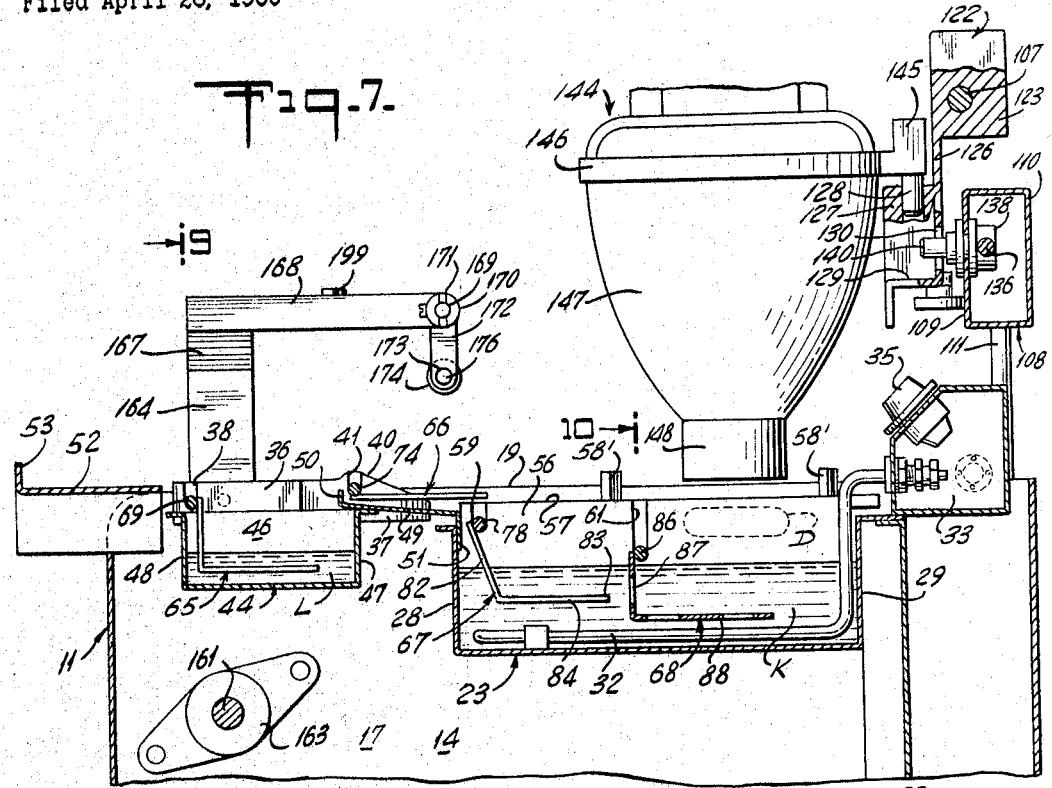
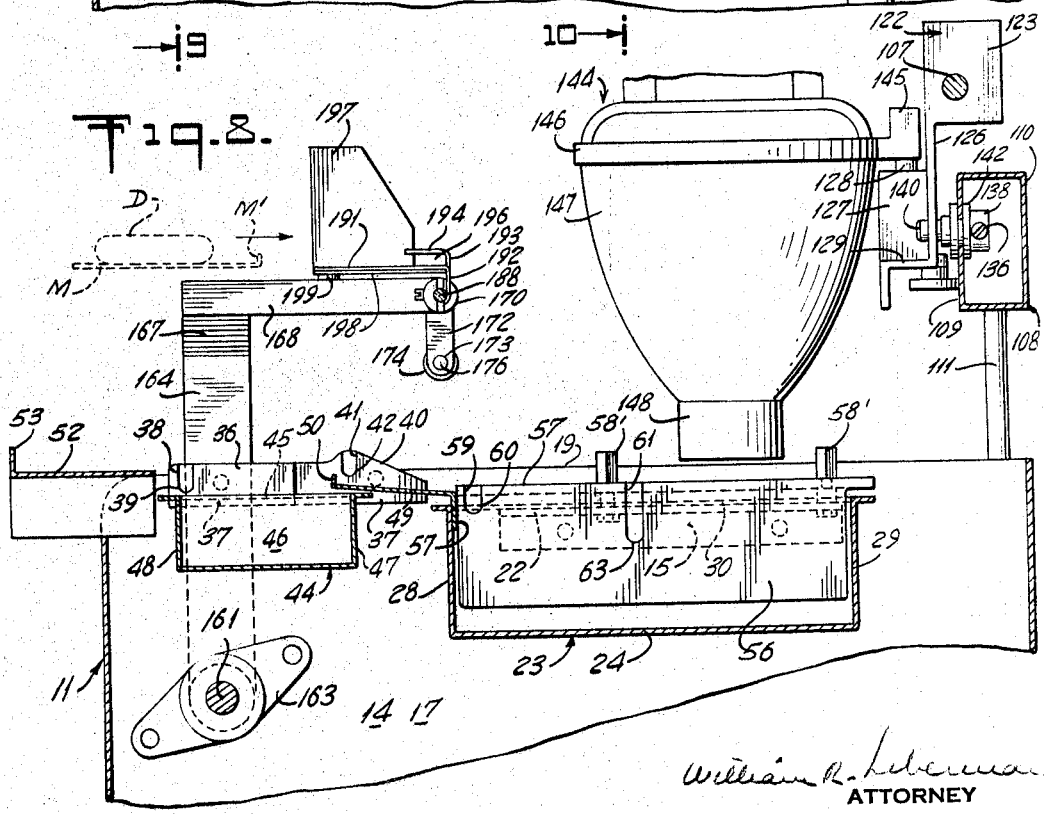

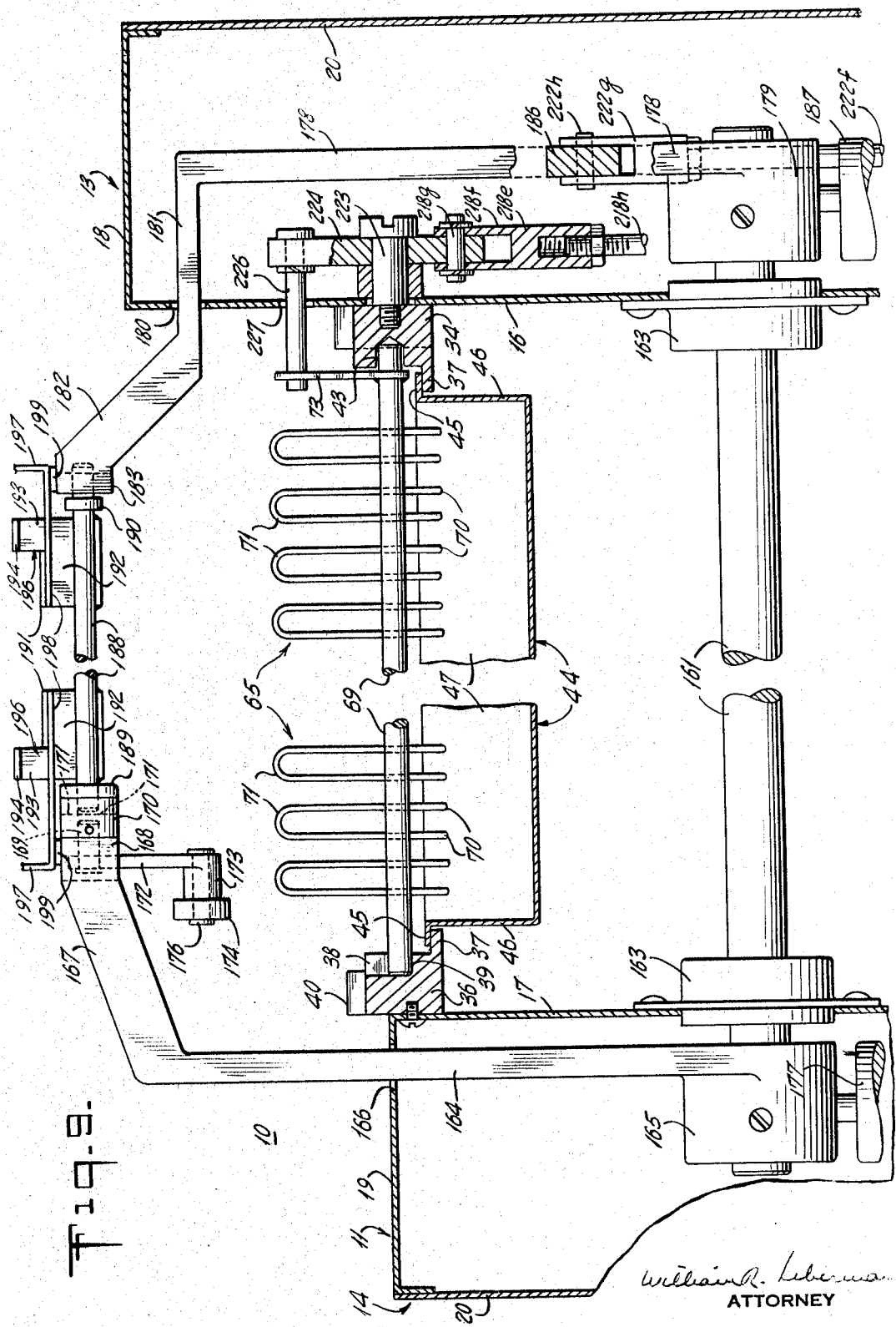

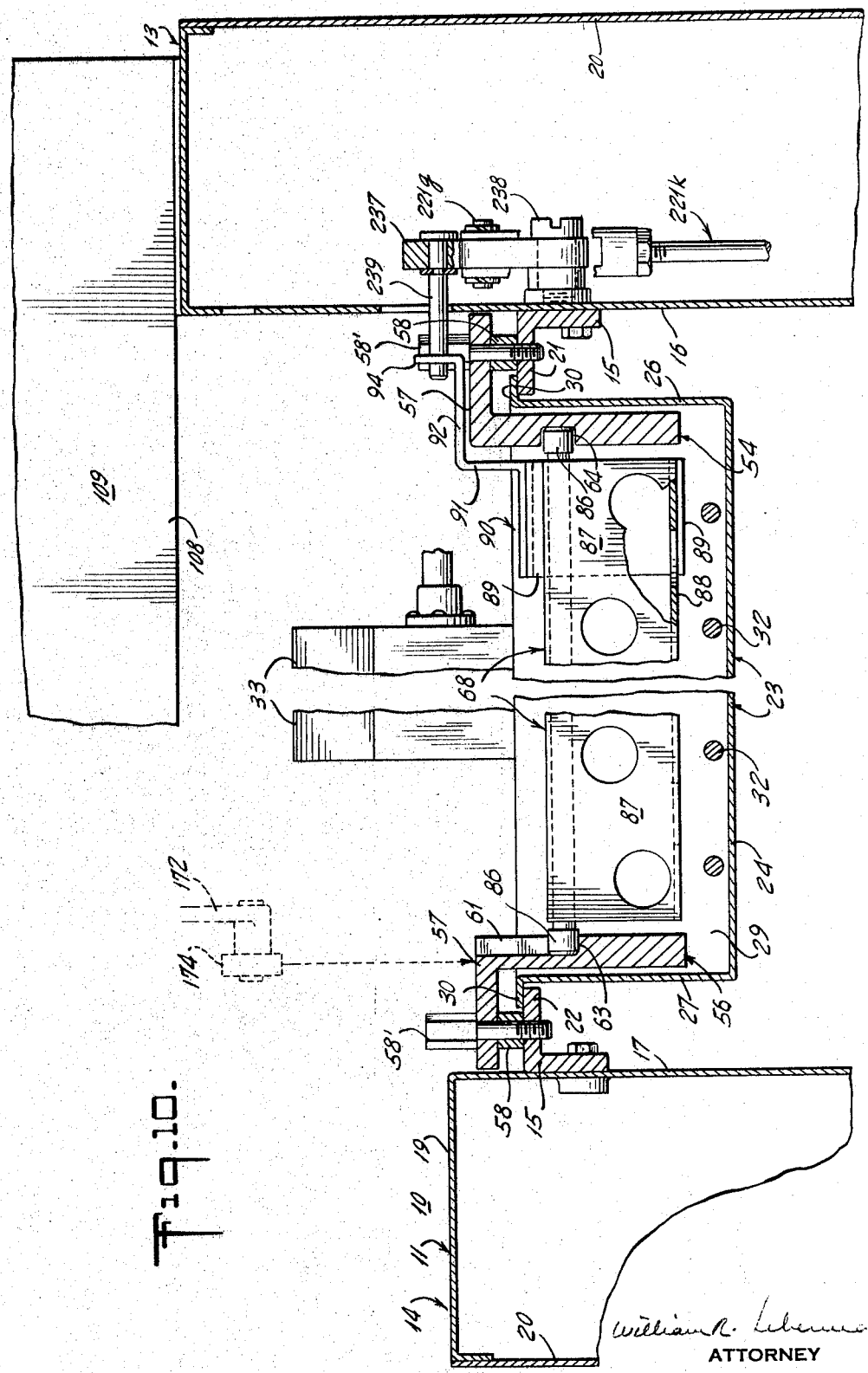

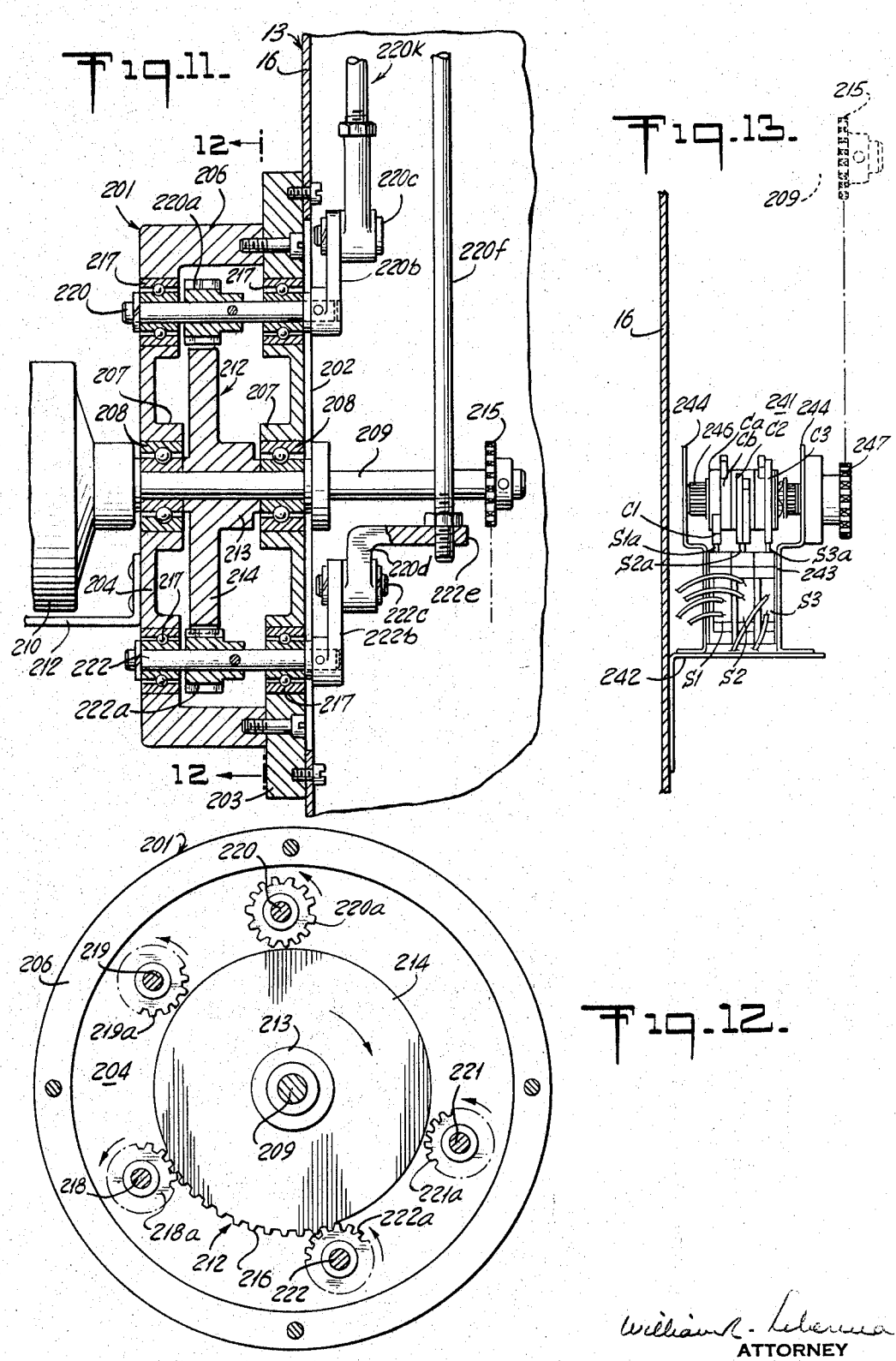

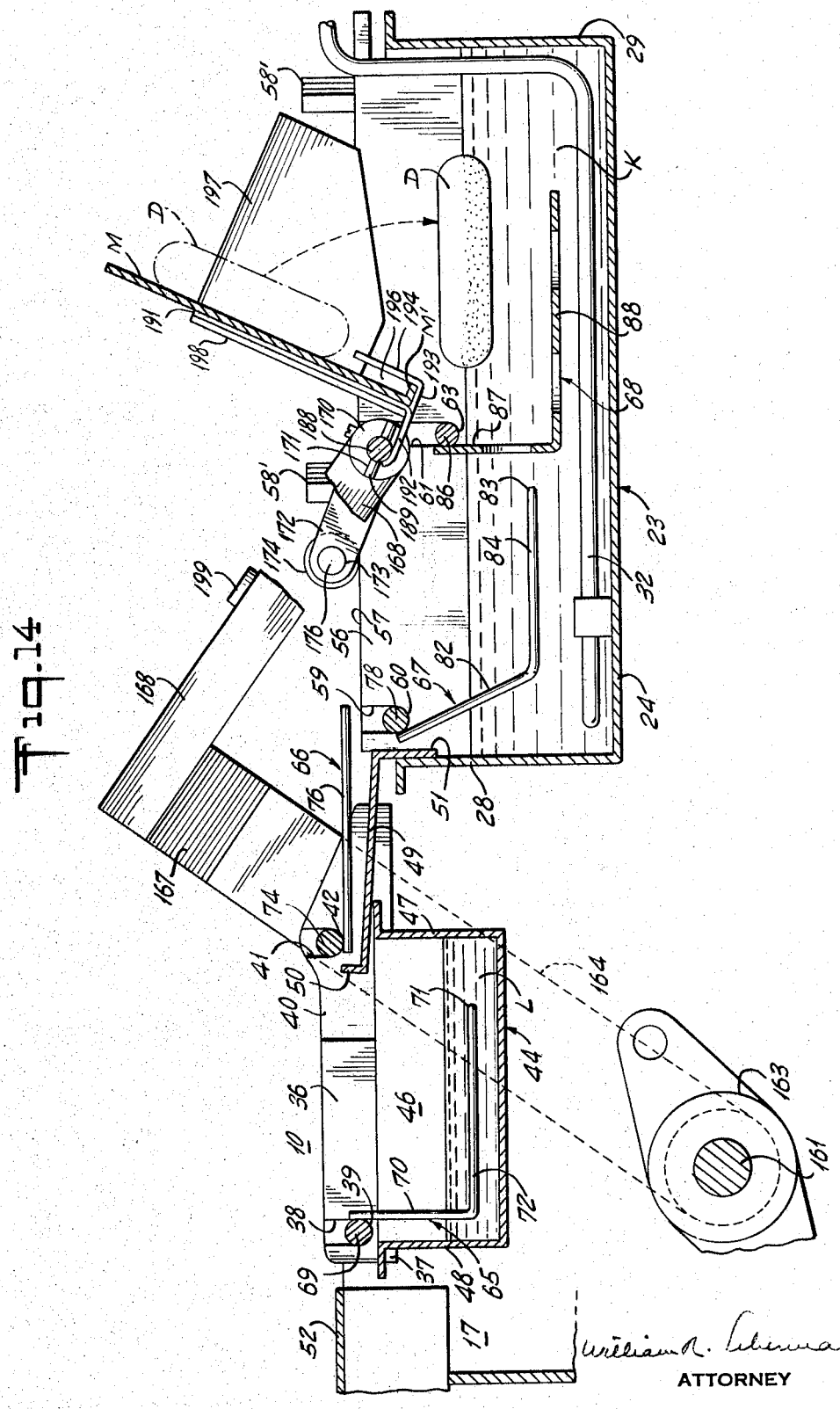

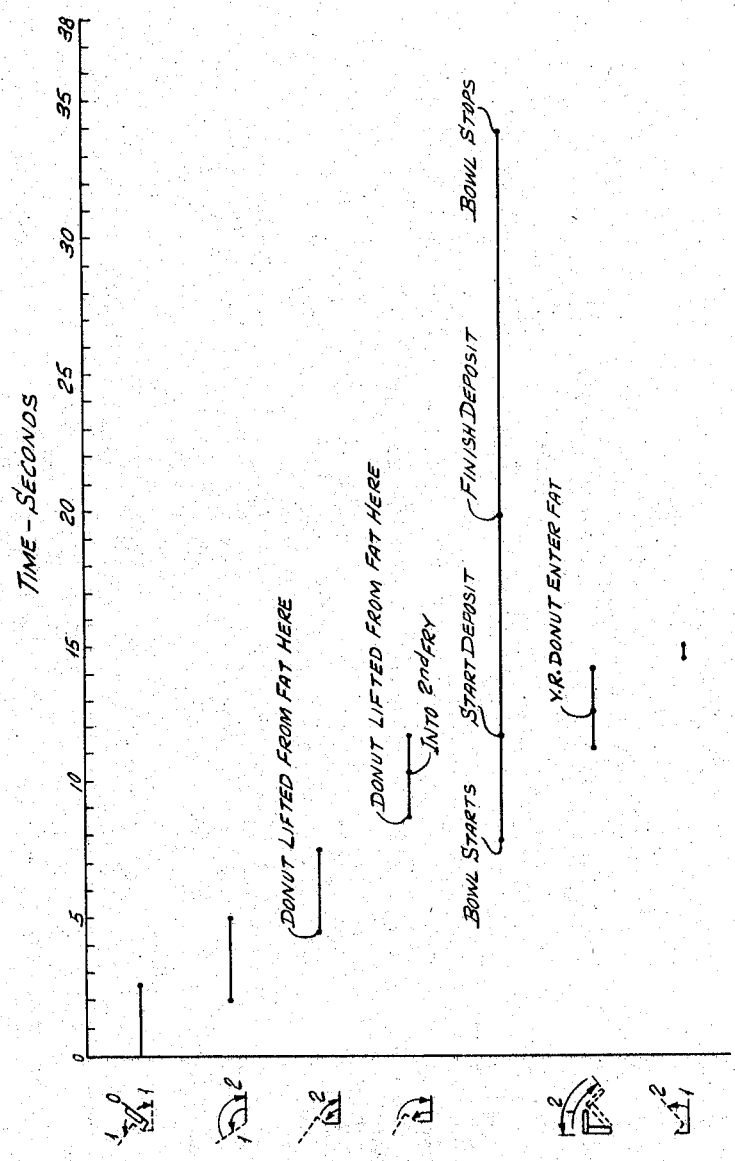

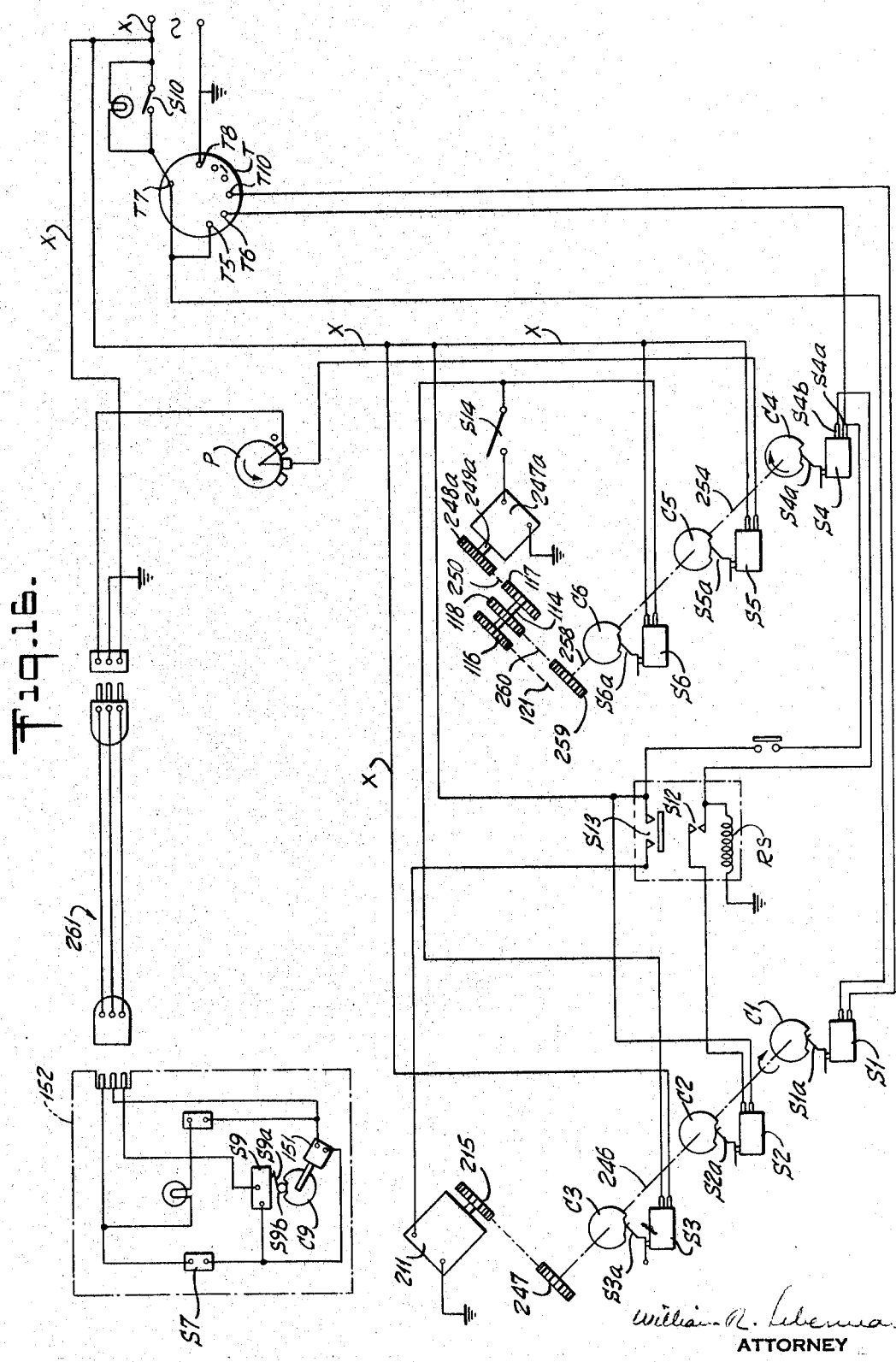

---

3,298,302
APPARATUS FOR PRODUCING FRIED
COMESTIBLES
Edward W. Fries, Baltimore, Md., and Harold B. Kaufman, Jr., New York, Albert Spiel, Yonkers, and David H. Lipka, Flower Hill, N.Y., assignors to DCA Food Industries Inc., New York, N.Y.
Filed Apr. 28, 1965, Ser. No. 451,493
25 Claims. (Cl. 99—354)

The present invention relates generally to the improvements in apparatus for the production and handling of comestibles, and it relates in particular to an improved apparatus for the production of fried cakes.

In the production of fried cakes such as doughnuts, crullers or the like, whether formed of yeast raised or leavening raised dough or batter, the cut pieces of dough are dropped into a hot fat or oil in which they float. After one side of the dough piece is sufficiently cooked it is inverted to effect the cooking of the other side and the fried cakes are then removed from the hot oil. Various types and sizes of apparatus are available for the cooking of the cakes on a commercial or semi-commerical scale varying from a small cooking vessel into which the shaped dough pieces are dropped from a hand operated dough extruder and cutter, the fried cakes being inverted by hand, to an elongated trough containing the cooking oil and provided with motor driven endless chains provided with flights which continuously advance the dough pieces along the cooking troughs and an intermediately disposed turning paddle inverting the cakes midway in their advance. A motor driven and motor traversed dough extruder and cutter drops the dough pieces into the feed end of the cooking trough or an automatic arrangement feeds the dough pieces thereto from continuously delivered transport trays. The doughnut producing machines heretofore available possess many drawbacks and disadvantages. They are generally of little versatility and adaptability, are of limited application, and otherwise leave much to be desired. The smaller equipment involves high labor consumption yet is of low capacity, and the end product thereof lacks uniformity and is frequently of an inferior quality. The high capacity commerical equipment is quite complex, bulky and expensive, of little adjustability and quite unsuitable for limited production. While there are available doughnut forming and cooking machines of an intermediate capacity, these are likewise expensive pieces of equipment, of little versatility, adaptability and reliability.

It is, therefore, a principal object of the present invention to provide an improved apparatus for the production and handling of comestibles.

Another object of the present invention is to provide an improved apparatus for the production of fried cakes.

Still another object of the present invention is to provide an improved apparatus for the automatic control and conveyance of comestibles along predetermined paths during the process of formation.

A further object of the present invention is to provide an improved apparatus for the hot fat cooking of cakes.

A still further object of the present invention is to provide an automatic cake frying apparatus having associated therewith selectively operable means for forming and dropping pieces of dough therein or for transferring thereto dough pieces from a removable tray.

Another object of the present invention is to provide an improved apparatus for the production of glazed doughnuts.

Another object of the present invention is to provide an improved cake frying apparatus in which the cooking time is widely adjustable without interfering with the overall efficient operation of the apparatus.

Another object of the present invention is to provide an improved apparatus of the above type characterized by its ruggedness, adaptability, versatility, efficiency, ease of servicing and cleaning, and reliable in operation.

The above and other objects of the present invention will become apparent from a reading of the following description taken in conjunction with the accompanying drawings, wherein:

FIGURE 1 is a front elevational view of an apparatus embodying the present invention;

FIGURE 2 is a top plan view thereof;

FIGURE 3 is an enlarged fragmentary right hand end view thereof with a cover plate removed to expose the main tray member turning mechanism;

FIGURE 4 is a fragmentary longitudinal sectional view illustrating the cooking vessel and icing vessel, and the cake handling tray members which are shown by full line in their retracted rest positions and by broken line in their advanced positions;

FIGURE 5 is a sectional view taken along line 5—5 in FIGURES 1 and 6;

FIGURE 6 is a sectional view taken along line 6—6 in FIGURE 5;

FIGURE 7 is an enlarged fragmentary sectional view taken along line 7—7 in FIGURE 2;

FIGURE 8 is a view similar to FIGURE 7 illustrating the application of a tray to the tray unloading mechanism;

FIGURE 9 is an enlarged fragmentary sectional view taken along lines 9—9 in FIGURES 3 and 7;

FIGURE 10 is an enlarged fragmentary sectional view taken along lines 10—10 in FIGURES 3 and 7;

FIGURE 11 is an enlarged fragmentary sectional view taken along line 11—11 in FIGURE 3;

FIGURE 12 is a sectional view taken along line 12—12 in FIGURE 11;

FIGURE 13 is an enlarged fragmentary sectional view taken along line 13—13 in FIGURE 3;

FIGURE 14 is an enlarged longitudinal sectional view of the icing and cooking vessels, tray members, and tray unloading mechanism, in the tray unloading position;

FIGURE 15 is a table of the operational sequence and a graph of the timing of the steps of the operational cycle of the present apparatus; and FIGURE 16 is a schematic diagram of the electrical control network of the present apparatus.

In a sense, the present invention contemplates the provision of a comestible treating apparatus comprising a plurality of longitudinally-spaced, transversely-extending tray members swingable about respective transverse axes, means for rearwardly sequentially rocking said tray members between advanced and retracted positions, and means for periodically intermittently actuating said rocking means at predetermined intervals independently of said rocking means. The actuating intervals are adjustable independently of the tray member rocking cycle. The apparatus, when employed for the production of glazed doughnuts, is provided with a cooking vessel, an icing vessel disposed forwardly of the cooking vessel, a first tray member swingable between a retracted position within the icing vessel and an upwardly directed discharge position above the icing vessel, a second tray member swingable between a retracted position bridging the two vessels and an upwardly directed discharge position over the icing vessel, a third tray member swingable between a retracted position within the leading section of the cooking vessel and a discharge position above the retracted second tray member, and a fourth tray member swingable between a retracted position within the trailing section of the cooking vessel and a discharge position projecting above the retracted third tray member. There is advantageously provided a dough forming and cutting device movable along a transverse path over the trailing section of the cooking vessel and a tray unloading mechanism forward of the cooking vessel for depositing articles therefrom into the trailing section of the cooking vessel.

According to a preferred form of the present apparatus, the tray member sequencing and rocking mechanism includes a sector gear along the peripheral path of which are positioned five pinion gears which are successively engaged and rotated a single revolution by the sector gear during a single revolution thereof. Each pinion gear is coupled by a crank and connecting rod assembly to a respective tray member and the tray unloading mechanism whereby the trays are sequentially rocked from the front to the rear tray member and then the unloader is actuated. The tray unloader includes a swingable lever coupled by a crank-connecting rod assembly to the fifth pinion gear, and carries a pivoted bracket for releasably engaging the tray and means for tilting the bracket upwardly and rearwardly as it is advanced to the cooking vessel. The sector gear is connected to an electric motor through an overload clutch, the electric motor being periodically energized by an adjustable timing switch and deenergized upon a single revolution of the sector gear, the timing switch being reset in response to a predetermined position of the operational cycle. The traversing dough piece-forming device is actuated so as to drop a plurality of spaced dough pieces into the cooking vessel upon the retraction of the fourth or trailing tray member, and may be selectively disabled.

Referring now to the drawings which illustrated a preferred embodiment of the present invention, and particularly to FIGURES 1, 2, 4, 8 to 10 and 14 thereof, reference numeral 10 generally designates the improved apparatus for the frying and icing of leavening-raised cake doughnuts or yeast-raised cakes. The apparatus 10 comprises an open topped support frame and cabinet 11 which houses and supports the various components including the drive and control elements of the apparatus, and is mounted on swivel casters 12 to provide easy mobility to the apparatus 10. The sides of cabinet 11 are defined by right hand and left hand vertical enclosure housings 13 and 14 respectively, housing 13 projecting above the level of housing 14. Housings 13 and 14 are provided with inner parallel mounting walls 16 and 17 and longitudinally extending horizontal top walls 18 and 19 respectively and removable vertical outer walls or cover plates 20 which afford access into housings 13 and 14.

A pair of longitudinally-extending opposite parallel angle members 15 are secured by bolts to the confronting faces of the rear sections of walls 16 and 17 a short distance below the level of housing wall 19 and are provided with coplanar inwardly directed legs 21 and 22 respectively. An open-topped rectangular cooking receptacle or vessel 23 is located between walls 16 and 17 and supported by angle legs 21 and 22. Cooking vessel 23 includes a horizontal bottom wall 24, vertical side walls 26 and 27 spaced inwardly of support walls 16 and 17 respectively and vertical front and rear walls 28 and 29. Projecting outwardly from the upper edges of side walls 26 and 27 are horizontal flanges 30 which rest atop angle legs 21 and 22. The legs of an electrical heating element 32, preferably of the metal sheathed type, extend along and are spaced above the base 24 of vessel 23, element 32 being supported by and connected through a transversely extending control box 33 suitably mounted rearwardly and above cooking vessel 23 and removable as a unit with the heating element. Control box 33 contains any conventional adjustable network for regulating the temperature of the cooking oil in vessel 23 to the desired level.

Secured to the inner faces of mounting walls 16 and 17, forward of angle legs 22 and 21 and at the level of housing top wall 19, are a pair of journal mounting bars 34 and 36 respectively, provided along their lower edges with inwardly-directed longitudinally-extending parallel coplanar flanges 37. A first vertical groove 38 is formed in the inner face of bar 36 slightly rearwardly of the leading end thereof, which groove extends from the top face of bar 36 to a semicircular base 39 located above the level of flanges 37. Bar 36 is provided with a raised trailing section 40, in the inner face of which is formed a second vertical groove 41 extending from the top of bar section 40 to a semicircular base 42 above the level of semicircular base 39. A pair of cylindrical bearing wells 43 having conical bases are formed in support bar 34 and are in axial alignment with respective opposite groove bases 39 and 42.

An open-topped horizontal rectangular icing receptacle or vessel 44 is located between walls 16 and 17 forwardly of cooking vessel 23 and a short distance above the level thereof. Vessel 44 is of the width of and otherwise of lesser dimensions than cooking vessel 23 and includes vertical side walls 46 provided along their upper edges with outwardly directed flanges 45 resting on bar flanges 37, a rear wall 47 and a front wall 48. A rearwardly, downwardly inclined drain plate 49 extends between the upper edges of confronting icing and cooking vessel walls 47 and 28, the forward section of drain plate 49 overhanging the trailing section of icing vessel 44 and terminating in an upwardly directed lip 50 and the trailing edge of the drain plate 49 terminating in a depending skirt 51 which engages the inner face of front wall 28 of the cooking vessel 23. Suitably slideably supported just forwardly and above the top level of icing vessel 44 is a transversely extending separable horizontal discharge or transfer tray 52 provided along its leading edge with an upstanding lip 53.

A pair of longitudinally-extending journal bracket plates 54 and 56 are disposed in cooking vessel 23 parallel to and spaced inwardly of the side walls 26 and 27 of the vessel. Plates 54 and 56 project above vessel walls 26 and 27 and terminate in outwardly-directed horizontal flanges 57 located above angle legs 21 and 22 and are supported thereon by longitudinally-separated spacer sleeves 58. Flanges 57 are separably secured to angle legs 21 and 22 by hex-head bolts 59, passing through corresponding openings in flanges 57, respective spacer sleeves 58 and engaging axially-aligned tapped bores formed in angle legs 21 and 22. Formed in the inner face of bracket plate 56 adjacent its leading upper corner is a vertical groove 59 which extends downwardly from the upper edge of bracket plate 56 for a short distance and terminates in a semicircular base 60. A second vertical groove 61 is formed in the inner face of the bracket plate 56 substantially intermediate the front and rear thereof and extends from the upper edge of the plate 56 to a point substantially intermediate the top and bottom edges of the plate 56 and terminates in a semicircular base 63. A pair of cylindrical bores 64 are formed in the inner face of bracket plate 54 in axial alignment with respective circular bases 60 and 63.

As best seen in FIGURES 4, 9, 10 and 14, the apparatus 10 is provided with a series of four successive cake transfer tray members, a first leading tray member 65 associated with icing vessel 44, a second tray member 66 associated with drain plate 49, and third and fourth tray members 67 and 68 associated respectively with the leading and trailing sections of cooking vessel 23. The first tray member 65 includes a horizontal transverse shaft 69 having one end thereof journalled in the leading bearing well 43 and the other end thereof resting in the groove bearing base 39. Secured to the rear face of shaft 69 are longitudinally spaced wire legs 70 which depend from shaft 69 when tray member 65 is in a fully retracted position. Integrally formed with pairs of successive legs 70 are rearwardly-directed coplanar U-shaped wire fingers 71 which define a transfer tray 72 which is swingable with shaft 69 between a retracted horizontal position disposed a short distance above the bottom of icing vessel 44 and an advanced upwardly forwardly inclined position partially overlying discharge tray 52, as shown by broken line in FIGURE 4.

In the normal rest position of tray member 65, as will be hereinafter described and as shown in full lines in FIGURE 4, tray 72 is upwardly rearwardly inclined and legs 70 are upwardly forwardly inclined whereby to support the icing-coated cakes in a draining position above icing vessel 44. A crank arm 73 is affixed to shaft 69 adjacent the end thereof journalled in well 43 and projects radially upwardly from shaft 69 and is provided with a circular coupling aperture 75 adjacent its free end.

The second tray member 66 includes a transversely extending shaft 74 which is journalled in groove base 42 and the axially aligned well 43. A grid-shaped tray 76 is secured to the underface of shaft 74 and projects horizontally rearwardly therefrom, when tray 66 is in its retracted position to a position overlying drain plate 49. Shaft 74 has a radially upwardly rearwardly projecting crank arm 77 affixed thereto adjacent well 43 and provided with a coupling aperture 230 adjacent its free end. The third tray member 67 comprises a transversely extending shaft 78 journalled in groove base 60 and axially aligned well 64. Shaft 78 is provided with a radially rearwardly projecting crank arm 79 adjacent well 64, said crank arm 79 having an outwardly laterally projecting arm 80 terminating in an ear 81 provided with a coupling aperture 85. Secured to the rear face of shaft 78 and inclined rearwardly downwardly therefrom are a plurality of longitudinally spaced parallel wire legs 82. A U-shaped wire finger 83 is integrally formed with each pair of successive legs 82 to define a tray 84 which, in the normal retracted rest position of tray 67, is disposed horizontally within the forward section of cooking vessel 23 above the bottom wall 24 thereof.

The fourth tray member 68 comprises a transverse shaft 86 journalled in and between groove base 63 and corresponding well 64. Secured to and depending from the front face of shaft 86 is a vertical apertured plate 87 having integrally formed along its bottom edge a rearwardly-directed horizontal tray-defining apertured plate 88 located in cooking vessel 23 below the level of tray 84. An arm 89 is secured to and directed upwardly from the rear right hand corner of tray plate 88 and terminates at its top in a rearwardly-directed flange on which is mounted an overlying bar 90 provided along its outer edge with an upwardly projecting leg 91 which, in turn, has formed at its top edge an outwardly horizontally projecting arm 92 which terminates in an upwardly-directed ear 94 provided with a coupling aperture 95.

The second tray member 66 is normally in a retracted position, with tray 76 horizontal and overlying drain plate 49, and is swingable to an advanced position with tray 76 in a forwardly upwardly inclined position overlying the retracted tray 72, as shown by broken line in FIGURE 4. The third tray member 67 is normally in a retracted position with tray 84 disposed horizontally in the forward section of cooking vessel 23, and is swingable to an advanced position with tray 84 being forwardly upwardly inclined and overlying the retracted tray 76 also as shown by broken line in FIGURE 4. The fourth tray member 68 is likewise in a normally retracted position with tray 68 being horizontally disposed in the rear section of the cooking vessel 23 and is swingable to an advanced position with the tray 68 being forwardly upwardly inclined to overlie the retracted tray 84.

The apparatus for forming pieces of leavening raised cake dough and batter and dropping them in suitably spaced and timed relationship into the rear section of cooking vessel 23 over or in the area of the retracted fourth tray 88, as seen in FIGURES 1, 2 and 5 to 8, comprises a vertical rectangular housing 96 located along and projecting above the rear upper section of housing 13 and including vertical front and rear walls 97 and 98 and inner and outer vertical side walls 99 and 100 respectively. A bracket is suitably mounted at the upper rear corner of housing 14 and includes a horizontal outwardly directed arm 101 disposed rearwardly of housing 14 and provided at its free end with an upright arm 102 terminating at its top in a transversely extending collar 103. A bracket 104 is mounted on the upper part of side wall 99 of the housing and projects forwardly thereof and terminates in collar 106 in axial alignment with collar 103. A track-defining rod 107 engages and extends between collars 103 and 106 and is fixed in position by a lock screw associated with collar 103, track 107 being disposed above and behind cooking vessel 23.

A traverse housing 108 is parallel to and located below track 107 and extends between the front face 97 of the housing and a point beyond housing 14. Housing 108 has a vertical front wall 109 and a vertical rear wall 110 which is secured at its end to the housing front face 97, the opposite end of the housing 108 being supported by a post 111 mounted on bracket arm 101 and secured to housing 108. A guideway-defining slot 112 is formed in front wall 109 of the housing intermediate the top and bottom and for substantially the full length thereof.

A bearing block 113 is mounted on the inner face of the housing wall 97 at the medial level of housing 108, and has journalled therein a longitudinally extending shaft 114 which projects through aligned openings in walls 97 and 110 into housing 108 at the level of slot 112. A sprocket wheel 116 is located within housing 108 and is secured to the front end of shaft 114, and a pair of axially spaced sprocket wheels 117 and 118 are located in the housing 96 and secured to the rear section of shaft 114. At the opposite end of housing 108 and mounted on the rear face of wall 110 thereof is a bearing block 119. A shaft is journalled in the bearing block 119 and projects into housing 108 and has secured to its front end a sprocket wheel 120 which is in transverse horizontal alignment with sprocket wheel 116. A sprocket chain 121 is in engagement with and extends between sprocket wheels 116 and 120 and includes upper and lower horizontal transverse runs disposed above and below the guide slot 112.

A trolley 122 is slidable along track 107 and includes an upper block 123 provided with a transverse bore engaging the track and an integrally formed skirt 126 depending from the front face of the block. Formed on the left hand front face of skirt 126 is a coupling block 127 provided in its top face with a cylindrical well which is engaged by a vertical upwardly-directed fulcrum pin 128. A flange 129 is directed forwardly from the bottom edge of skirt 126 and terminates in a depending lip. A vertical coupling slot 130 is formed in skirt 126.

A forwardly-directed pin 131 provided with an enlarged rear head 132 is secured to link chain 121 and advanced thereby and pivotally supports a registering bearing collar 133 which is provided with a radially projecting internally threaded sleeve 134. A turnbuckle connecting rod 136, oppositely threaded at opposite ends thereof, engages at one end threaded sleeve 134 and engages at its other end a mating threaded sleeve 137 which projects radially from a cylindrical head 138 disposed within housing 108. A pair of nuts 139 engage the threaded ends of the rod 136 to permit the locking and unlocking thereof attendant to adjustment of the turnbuckle. A coupling pin 140 projects coaxially forwardly from the head 138 through guide slot 112 into vertical sliding engagement with trolley coupling slot 130. Positioned on pin 140 is a roller member 141, having a medial hub registering with the guide slot 112 and substantially engaging the upper and lower edges thereof and provided with outwardly-directed peripheral annular flanges 142 which slidably substantially sandwich the upper and lower borders of the guide slot. A spacer ring 143, coaxial with pin 140, is positioned between the skirt 126 and front roller flange 142.

A doughnut or dough ring forming and cutting device or bowl 144 of well-known and conventional construction is separably carried by trolley 122 above the trailing section of cooking vessel 23 and includes an upper support frame 146 provided at its trailing end with a vertical sleeve 145 which engages the fulcrum pin 128. The dough ring former 144 comprises a dough hopper 147 carried by frame 146 and provided with a depending cylindrical nozzle 148 having a downwardly-directed discharge opening located along the medial transverse axis of the trailing section of cooking vessel 23. A drive and control unit 149 is mounted atop support frame 146 by means of a bracket 150 formed with and extending above support frame 146 and includes a low speed electric drive motor 151, a control box or housing 152 and an eccentric housing 153. The output of motor 151 is provided with a radially-adjustable eccentrically mounted pin 154 which is coupled by a connecting link 156 to a depending plunger rod 157 which is vertically slidably supported by a guide sleeve 158 carried by a bracket arm 159 above hopper 147 and coaxial with nozzle 148. The lower end of rod 157 is provided in the known manner with a metering plunger and disc valve and cutter which register with nozzle 148 whereby a reciprocation of rod 157 by a revolution of eccentric pin 154 effects the metered extrusion, forming, cutting and droppingf of a ring of dough from nozzle 148. The frame is provided with a handle 160 to facilitate the manipulation of the dough ring forming device 144.

In order to effect the depositing of preformed pieces of dough, such as yeast-raised dough pieces, from a tray into the trailing section of the cooking vessel there is provided a transfer mechanism, as best seen in FIGURES 2, 3, 7 to 10 and 14 of the drawing, which comprises a transverse horizontal shaft 161 located below the leading end of icing vessel 44. Shaft 161 extends between, projects through, and is journalled in a pair of coaxial bearing blocks 163 affixed to the inner faces of housing walls 16 and 17, and registering with openings formed therein. A first transfer arm 164 is provided at its lower end with a hub 165 suitably secured to the end of shaft 161 within housing 20 and projects radially through a longitudinal slot 166 in housing wall 19. An upwardly inwardly inclined arm 167 extends from the upper end of the arm 167 and terminates in a rearwardly longitudinally directed finger 168.

A transverse rocker pin 169 engages a corresponding opening formed in the free end of finger 168 and is rotatable therein, the inner end of pin 169 having secured thereto and projecting inwardly thereof a coupling collar 170 having a diametrically extending slot 171 formed in the inner face thereof. Suitably secured to the outer end of the pin 169 and depending therefrom is an arm 172 which terminates in an outwardly-directed transverse bearing sleeve 173. A follower roller 174 is rotatably supported at the outer end of sleeve 173 by a pin 176, and lies in the vertical plane of the bracket flange 57 which defines a cam surface. A counterweight 177 is secured to the underface of hub 165 and is radially adjustable relative thereto and functions to urge arm 164 toward its upright position.

A second transfer arm 178 is located within housing 13 and is provided at its lower end with a hub 179 secured to a corresponding end of shaft 161, arm 178 projecting radially upwardly from hub 179. Directed inwardly from the upper end of the arm 178 through an arcuate opening 180 in the housing wall 16 is a transverse leg 181 which joins an upwardly inwardly inclined arm 182 which in turn terminates in a rearwardly projecting leg 183 which is parallel to and at the level of the opposite leg 168. Leg 183 is provided at its free end with bearing saddle-defining open-topped downwardly rearwardly extending slot 184 terminating in an arcuate base coaxial with pin 169. An apertured lug 186 projects rearwardly from arm 178 a short distance above shaft 161 and a counterweight 187 depends from the underface of hub 179 and is radially adjustable relative thereto.

A transverse shaft 188 has one end journalled in the base of groove 184 and its other end engaged in the axial bore in coupling collar 170. A collar 189 is affixed to shaft 188 in abutment with coupling collar 170 and is provided with a diametric rib which is in engagement with the coupling collar groove 171 whereby shaft 188 rotates with pin 169 which is rocked by the follower-carrying arm 172. A collar 190 is secured to the other end of shaft 188 adjacent arm 183 to limit the axial movement of the shaft.

A pair of laterally-spaced coplanar tray support plates 191 are provided at their rear edges with depending flanges 192 which are secured at their lower edges to the front face of shaft 188 so that plates 191 are horizontal when arm 172 is vertical. Integrally formed at the outer rear corner of each plate 191 along the rear edge thereof is an upwardly projecting leg 193 which terminates in a forwardly projecting arm 194 parallel to plate 191 and defining therewith a tray engaging clip 196. A pair of parallel vertical transversely-spaced retaining plates 197 project upwardly from the outer edges of each plate 191 and the retainers are provided along their bottom edges with inwardly-directed flanges 198 which are secured to the underfaces of the plates 191. Located on the tops of the arms 168 and 183 are bumper elements 199 which engage the forward underfaces of flanges 198 when plates 191 are in their retracted horizontal position. A tray member M, which may be a conventional proofing tray for yeast-raised cakes, is provided with an upstanding lip M' along its longitudinal edge which is movable into engagement with clips 196 and abutment with rear legs 193 to retain separably the tray M on plates 191 between plates 197 and to prevent its movement beyond legs 193.

The mechanism for effecting the sequential operation of trays 65, 66, 67 and 68 and the tray unloading mechanism is best seen in FIGURES 1, 3, 4, 11 and 12, and comprises a gear housing 201 mounted on housing wall 16 in registry with a circular opening 202 formed therein. Housing 201 includes a circular base plate 203 secured by screws to the border of opening 202 and a cover member including a circular end wall 204 parallel to, coaxial with and spaced inwardly of the base plate 203 and provided with a cylindrical wall 206 integrally formed with and directed from the periphery of wall 204 to base plate 203 to which it is suitably secured, as by screws. Centrally formed in walls 203 and 204 are aligned coaxial bores which are surrounded by sleeves 207 which are integrally formed with the walls 203 and 204 and engage aligned ball bearing members 208.

A shaft 209 is journalled in and between and projects beyond the ball bearing members 208. The inner end of shaft 209 is connected through a torque limiting or overload clutch 210 to the output shaft of a drive motor 211 which is supported on a mounting bracket 212 secured to and projecting horizontally from the housing wall 204. Clutch 210 may be of any well-known overload type and limits the torque transmitted to the shaft 209 to prevent damage to the equipment which may result from inadvertent overloading or jamming thereof. A sector gear 212 is located in the housing 210 and includes a hub 213 affixed to the shaft 209 and a circular web 214 provided with teeth 216 extending for a predetermined minor portion of the periphery of the web 214. Sprocket wheel 215 is affixed to the free end of the shaft 209.

Formed in housing walls 203 and 204 are five peripherally spaced pairs of axially aligned bores in each of which is positioned a ball bearing member 217. Journalled in and supported by corresponding pairs of ball bearing members 217 are shafts 218, 219, 220, 221 and 222 respectively, each of which projects beyond housing wall 203. Located in the housing 201 about the periphery of the sector gear 212 and affixed to each of the shafts 218, 219, 220, 221 and 222 is a corresponding pinion gear 218a, 219a, 220a, 221a and 222a respectively, each of the pinion gears having the same number of teeth as sector gear 212 whereby a single revolution of the sector gear 212 successively effects a single rotation of each of the pinion gears. The relative locations and peripheral spacing of the pinion gears 218a to 222a will be hereinafter set forth.

A pivot pin 223 provided at opposite ends with an enlarged head and a threaded shank respectively, engages a tapped transverse bore in bar 34 (FIGURE 9) and projects outwardly therefrom through an opening in housing wall 16. A triangular rocker plate 224 is pivoted at a corner thereof on pin 223, which is coaxial with tray member shaft 69, for rocking about the axis thereof and is provided at a second upper corner thereof with a coupling pin 226 secured to plate 224 and which projects through an arcuate slot 227 in housing wall 16 into mating engagement with coupling aperture 75 in tray rocking arm 73. A crank arm 218b is affixed to the end of the shaft 218 and has pivoted to the end thereof, by means of a pin 218c, an integrally threaded sleeve 218d having an enlarged circular head provided with an axial bore engaged by the pin 218c. An opposite internally threaded sleeve 218e terminates in a yoke section 218f which is pivoted to the third forward lower corner of the rocker plate 224 by a pin 218g. A connecting rod 218h, oppositely threaded at opposite ends thereof, engages sleeves 218d and 218e to define therewith an adjustable length connecting rod assembly 218k coupling crank arm 218b and the rocker plate 224 whereby a single revolution of shaft 218 effects a single oscillation or rocking of tray member 65.

A headed pin 228 is secured to and projects outwardly from bar 34 and is coaxial with the second tray member shaft 74. Pivotally supported at a lower corner thereof by pin 228 is a triangular rocker plate 231 provided at a second upper rear corner thereof with a pin 232 which projects transversely therefrom through an arcuate slot 235 in housing wall 16 into engagement with the coupling aperture 230 formed in tray crank arm 77. A crank 219b is affixed to the end of the shaft 219 and its free end is coupled by a pin 219c to one end of an adjustable connecting rod assembly 219k, the other end of which is connected by a pin 219g to the third forward upper corner of rocker plate 231. Connecting rod assembly 219k is of similar construction to connecting rod assembly 218k. A revolution of shaft 219 effects a rocking of the second tray member 66.

A third triangular rocker plate 225 is pivotally supported at the bottom corner thereof by a pin 233 projecting from housing wall 16 coaxial with tray shaft 78 and is provided at a second upper rear corner thereof with a coupling pin 234 which projects through an opening 236 in housing wall 16 into engagement with the coupling aperture 85 in ear 81 on crank arm 79. A crank 220b is affixed to the end of the shaft 220 and is connected by a pin 220c to one end of an adjustable connecting rod assembly 220k, the other end of which is connected by a pin 220g to the third forward upper corner of the rocker plate 225. A fourth elongated rocker plate 237 is pivotally supported at a lower corner thereof by a pin 238 projecting from housing wall 16 coaxial with the tray shaft 86 and is provided at an end thereof, rearwardly of pin 238, with a coupling pin 239 which projects through an arcuate slot 240 in housing wall 16 coaxial with the shaft 86 into engagement with coupling aperture 95 in the tray crank ear 94. Another corner of rocker plate 237, disposed forwardly and above pivot pin 238, is connected by a pin 221g to one end of an adjustable connecting rod assembly 221k. The other end of the connecting rod assembly 221k is connected by a pin 221c to the free end of a crank arm 221b affixed to the end of shaft 221.

A crank arm 222b is affixed to the end of shaft 222 and has pivoted to the free end thereof by a pin 222c a radially projecting leg 222d terminating in an outwardly directed arm 222e provided with a tapped bore. A connecting rod 222f has a threaded end engaging the tapped bore and is oppositely threaded at its other end which engages an internally threaded sleeve 222g which is pivoted by a pin 222k to the apertured ear 186 of transfer arm 178.

In the rest position of the apparatus between transfer cycles, sector gear 212 is in engagement with pinion gear 218 to support the first tray member 65 in its intermediate drain position, sector gear 212 being rotated clockwise as viewed in FIGURE 12 for one revolution to rotate successively pinion gears 218a to 222a for single revolutions to effect a transfer cycle, gear 218a being rotated a major part of its unit revolution at the beginning of the cycle and the remainder thereof at the end of the cycle. The peripheral spacings between the pinion gears 218a and 219a, and between pinion gears 219a and 220a are somewhat less than the peripheral extent of the teeth on sector gear 212 so that gear 212 engages pinion 219a before it disengages pinion 218a and engages pinion 220a before it disengages pinion 219a, and the rocking of the tray members 66 and 67 is commenced before the complete retraction of tray members 65 and 66 respectively. Pinion gear 221a is engaged by sector gear 212 after disengagement with pinion 220a so that the turning of tray member 68 starts after the end of the turning of tray member 67. Pinion gear 222a is engaged by sector gear 212 before disengagement of pinion 221a to start the tray unloading cycle before the retraction of tray member 68. Pinion 218a is engaged by sector gear 212 immediately after disengagement of pinion 222a to complete the transfer cycle.

The electrical control network, as best seen in FIGURES 3, 5, 6, 13 and 16, comprises first multiple switch assembly 241 located within the lower part of the housing 13 and including a bracket 242 mounted on housing wall 16 and carrying a pair of spaced parallel mounting plates 243 provided with outwardly offset journal plates 244. Three switches S1, S2 and S3 are stacked and supported by and between the mounting plates 243 and are provided with actuating arms S1a, S2a and S3a respectively. Switches S1 and S3 are normally closed and switch S2 is normally open, and these switches are urged to their opposite condition upon depression of the respective switch arms.

A cam shaft 246 is journalled between the plates 244, projecting beyond one of the plates, and has angularly adjustably affixed to an end thereof a sprocket wheel 247 which is coupled to the sprocket wheel 215, of similar size, whereby cam shaft 246 and shaft 209 are synchronously driven at the same speed. Mounted on cam shaft 246 and rotatable therewith are adjustable cam units C1, C2 and C3 which are in registry with switch arms S1a, S2a and S3a respectively and are adapted to actuate the switches S1, S2 and S3. Each cam unit C1, C2 and C3 is independently angularly adjustable on cam shaft 246 and include a pair of cam elements Ca and Cb which are relatively angularly adjustable and each of which is provided with a raised section and a depressed section whereby the relative locations and peripheral extents of the raised and depressed sections of cam units C1, C2 and C3 may be adjusted. It should be noted that switch unit 241 is of conventional construction and commercially available.

Cam unit C1 is adjusted so that the depressed section thereof registers with switch arm S1a during the rest condition of the tray members and transfer mechanism between successive transfer cycles, and the raised section thereof registers with the switch arm S1a at least during part of the transfer cycle. Cam unit C2 is adjusted whereby the leading part of its raised section engages switch arm S2a before the raised section of cam unit C1 engages switch arm S1a and the raised section of the cam unit C2 extends peripherally to engage switch arm S2a until the transfer cycle is complete and tray member 65 assumes its intermediate drain position, at which point the leading part of the depressed section of cam unit C2 engages switch arm S2a. Cam C3 is adjusted to provide a relatively short depressed section which registers with switch arm S3a at about the start of the rocking of tray member 68 during the transfer cycle so that the dough forming unit 144 is advanced to the cooking vessel at about the termination of the rocking of tray member 68, the raised section of cam unit C3 occupying the remainder thereof.

An electric traverse drive motor 247a is suitably mounted in the housing 96 and is provided with a sprocket wheel 248a which is affixed to the motor drive shaft 249a, and is coupled by a sprocket chain 250 to the traverse drive sprocket wheel 116. A bracket is mounted on housing wall 100 between the traverse shaft 114 and the drive motor 247 and includes a transverse vertical wall 251 and a base plate 252. A multiple switch unit 253, similar in construction to switch unit 241, is mounted on the base plate 252 and includes a cam shaft 254 connected to the output of a speed reduction gear unit 256 the input shaft of which is connected by way of a coupling unit 257 to a coaxial shaft 258 suitably journalled to bracket plate 251. A sprocket wheel 259 is affixed to shaft 258 and is coupled by a sprocket chain 260 to sprocket wheel 118. Sprocket wheels 116, 118 and 259, traverse chain 121, and speed reduction unit 256 are so related that a full revolution of cam shaft 254 is synchronously effected with a full revolution or circuit of traverse chain 121 and a full reciprocating traverse of dough former 144.

Three adjustable cam units C4, C5 and C6, similar in construction to cam units C1, C2 and C3, are mounted on and rotate with cam shaft 254. Three switches S4, S5 and S6 cooperate with the cam units C4, C5 and C6 and are provided with actuating arms S4a, S5a and S6a registering with the cam units C4, C5 and C6 respectively. Switches S4 and S5 are normally closed and switch S6 is normally open. Cam unit C4 has a short depressed section which engages switch arm S4a when dough former 144 is in its fully retracted position, and in all other positions the raised section of the cam engages switch arm S4a to open switch S4. Cam unit C5 has a depressed section which engages switch arm S5a only while dough former 144 is disposed above cooking vessel 23 during most of the forward traverse of dough former 144 to keep switch S5 closed during such interval, and the raised section of the cam engages switch arm S5a at all other times to open switch S5. Cam C6 has a depressed section which engages switch arm S6a only when dough former 144 is in its retracted position to leave switch S6 open. During any position of dough former 144 the raised section of cam C6 engages switch arm S6a to close switch S6, it being noted that the leading part of the raised section of cam C6 engages switch arm S6a before the leading part of the raised section of turning cam unit C3 engages switch arm S3a to open switch S3.

Located in the housing 152 is an externally manipulatable toggle switch S7, an externally actuatable normally open momentary close switch S8 and a normally open switch S9 provided with an actuating arm S9a carrying a follower roller S9b. A cam C9 is mounted on the output shaft of slow speed motor 15 and is provided with a short depressed section which registers with the follower S9b when the motor operated plunger 157 (FIGURE 6) is in its raised predetermined closed position.

An adjustable interval timer T of well-known construction and operation, of the type which automatically resets upon a given signal, for example, a discontinuance of current or the breaking of a circuit to a control terminal thereof, is provided to effect an adjustable rest interval between transfer cycles and hence an adjustable cooking time. Timer T includes output terminals T5 and T6 of a switch which is open at the beginning of and during the preset timing interval and closed at the termination thereof, a control terminal T10 which energizes the timing cycle when connected to a suitable current source and effects the reset of the timing interval to its starting state upon the deenergization of terminal T10 either consequent to the opening of a switch or current failure, and current input terminals T7 and T8. A suitable timer T is the Bristol series 6100 time delay relay marketed by Bristol Motors of Old Saybrook, Connecticut, and described in their corresponding bulletin.

Referring to FIGURE 16 of the drawings, the present apparatus is energized by any suitable source of current one terminal of which is grounded and the other terminal of which is connected to a current carrying conductor network or power line x which includes one of the conductors in an elongated flexible three conductor cable or self-contracting extensible helical cord 261 connected between control box 152 and the remainder of the circuit, suitable mating plug and socket units being provided to permit the complete uncoupling of cable 261. Timer terminals T5 and T7 are connected through a toggle switch S10 to current conductor x and timer terminal T8 is grounded, switch S10 being shunted by a pilot light. Timer terminal T10 is connected through switch S1 to timer terminal T7, and timer terminal T6 is connected to terminal S4a of switch S4 which terminal is connected through a normally open reset switch S11 to power line x. The other terminal, S4b, of switch S4 is connected successively in series through a normally open relay switch S12 and switch S2 to power line x and is connected to ground through a relay solenoid RS which actuates relay switch S12.

The transfer motor 211 has one terminal grounded and the other terminal connected to power line x through a normally open relay switch S13 actuated by relay solenoid RS. The traverse motor 247 has one terminal grounded and has its other terminal connected in series with a toggle switch S14 both through the switch S3 to power line x and through switch S6 to power line x. The dough former motor 151 has one terminal grounded through cable 261 and its other terminal connected through the switch S7 by way of cable 261 in series through a power rheostat P and switch S5 to the power line x. The other terminal of motor 151 is also connected through parallel switches S8 and S9 and through the cable 261 to the power line x.

Considering now the operation of the apparatus described above as applied to the production of iced cake doughnuts and employing the dough forming and cutting device 144, cooking vessel 23 is filled with a cooking fat or oil K to the desired level and the icing vessel 44 is filled with a fluid glazing L to the desired level. The heating elements 32 are energized to heat oil K to the desired temperature as set by the control dial 35 and regulated by the temperature control network in the known manner. The former hopper 147 is filled with a dough or batter of the desired composition and the tray discharge mechanism including the support plates 191 is emptied of any tray M. The cooking timing interval between successive transfer cycles is adjusted to the desired time as indicated by timer pointer Ta, the pointer Tb indicating the instant time of the cooking interval. It should be noted that timer T may advantageously be adjustable up to a five minute interval although any desired range may be provided. The switches S7, S14 and S10 are then closed to effect the initiation of the operation of the apparatus.

Under normal operating conditions during the cooking interval and the transfer rest period, two sets or rows of doughnuts D are located in cooking vessel 23, one row floating in the oil K above retracted tray 88, and another row floating in the oil K above retracted tray 84. A row of fried doughnuts is carried by tray retractor 76, the oil draining therefrom onto drain plate 49 and returning to cooking vessel 23. A row of glazed or iced doughnuts is carried by the tray 72 in its intermediate position above icing vessel 44 and excess glaze or icing drains therefrom into the icing vessel 44. During the cooking interval the timer terminal T6 is in its open deenergized position.

Upon the termination of the timing interval or cycle of timer T the timer terminal T6 is closed, connecting it to power line $x$ thereby to energize relay solenoid RS through the normally closed switch S4. The energized solenoid RS closes switches S12 and S13, closed switch S13 connecting the transfer motor 211 to power line $x$ to energize motor 211 which rotates shaft 209 to effect the transfer cycle. Energized motor 211 also rotates cam units C1, C2 and C3, cam unit C2 promptly closing switch S2 to connect solenoid RS to power line $x$ through closed switch S12 thereby holding solenoid RS energized following the opening of timer terminal T6.

Rotating shaft 209 rotates sector gear 212 which, in its rest position and initially, is in engagement with pinion 218a to rotate pinion 218a for less than a full revolution by way of the associated crank and connecting rod assembly 218k whereby to rock shaft 69 and tray member 65 counterclockwise to its advance position overlying pan 52 to discharge a row of glazed doughnuts D from tray member 65 onto pan 52 with their surfaces uppermost, tray member 65 then being rotated counterclockwise to its fully retracted horizontal position below the level of the icing in vessel 44. Rotating sector gear 212, before disengaging pinion 218a, engages pinion 219a to initiate rocking of tray member 66 before retraction of tray member 65. Tray member 66 is rotated counterclockwise to its advanced position overlying the retracted tray member 65 shortly after the full retraction of tray member 65 to discharge the row of drained fried doughnuts from tray member 65 into icing vessel 44 over tray 72. Tray member 66 is then returned to its retracted horizontal position overlying drain plate 49.

Shortly before the full retraction of tray member 66 and disengagement of pinion 219a, sector gear 212 engages pinion 220a to initiate rocking of tray member 67 before full retraction of tray member 66, tray member 67 reaching its fully advanced position overlying tray member 66 shortly after the full retraction of tray member 66 to raise a row of fried doughnuts from the forward section of cooking vessel 23 and discharge them onto drain tray 76. Tray member 67 is then returned to its fully retracted horizontal position within the forward section of the cooking vessel 23. A short time after the retraction of tray member 67, in order to provide a longer frying time in the rear section of cooking vessel 23 and after disengagement of pinion 220a, sector gear 212 engages pinion 221a to rock the tray member whereby to raise a row of half fried doughnuts from the trailing section of cooking vessel 23 and invert and deposit them into the leading section of cooking vessel 23 above retracted tray 84. Before disengagement of pinion 221a, sector gear 212 engages pinion 222a to rock tray discharge arms 164 and 178 as will be hereinafter explained.

Immediately after disengagement of pinion 222a, the sector gear again engages pinion 218a and rotates it for part of a revolution to raise tray member 65 from its fully retracted position to its initial drain position thereby to complete the tray member transfer cycle. When tray member 65 reaches its drain position the depressed section of cam unit C2 engages switch arm S2a to open switch S2 and the energizing circuit of solenoid RS. The deenergizing of solenoid RS effects the opening of switch S13 and the stopping of motor 211 and shaft 209 at its initial rest position awaiting the initiation of the next transfer cycle.

At about the termination of the rocking of tray member 67 the short depressed section of cam C3 engages switch arm S3a to close switch S3 for a short period whereby to connect traverse motor 247a to power line $x$ and energize motor 247a. The thus energized motor 247a rotates shaft 114 through the associated sprocket wheels and chains, which in turn advances and retracts dough former and cutter 144 across the trailing section of the cooking vessel as effected by sprocket chain 121 and drives cam shaft 254 through speed reducer unit 256. Upon the start of the rotation of cam shaft 254 the raised portion of cam unit C6 engages switch arm S6a to close switch S6 and connect traverse motor 247a to power line $x$ therethrough and maintain traverse motor 247a energized for a full forward and return circuit of dough former and cutter 144 independently of the condition of switch S3.

When dough former 144 is advanced to a point directly above the left hand side of cooking vessel 23, substantially simultaneously with the retraction of tray member 68 the depressed section of cam unit C5 engages switch arm S5a to close switch S5 to connect to dough former and cutter motor 151 through cable 261 to power line $x$, whereby to energize the motor and reciprocate plunger 157. With each reciprocation of plunger 157 a dough ring is formed and dropped into the trailing section of cooking vessel 23, the advancing former device 144 successively dropping the dough rings as a row into cooking vessel 23. Cam C9 is rotated with each reciprocation of plunger 157, the depressed section of the cam engaging switch arm S9a when plunger 157 is in a predetermined closed position. Thus, when plunger 157 is not in said predetermined position switch S9 is closed by cam C9 to energize motor 151 independently of switch S5. As dough former 144 reaches a point in its advance a predetermined distance to the left of right hand side of the cooking vessel 23, the raised section of cam C5 engages switch arm S5a to open switch S5 at a time when switch C9 is closed. The plunger stroke will be continued until the depressed section of cam C9 engages switch arm S9a to open switch S9 and deenergize motor 151 to stop plunger 157 in its predetermined closed position. The dough former 144 is advanced by chain 121 and then returned to its fully retracted position, at which position the depressed section of cam C6 engages switch arm S6a to open switch S6 and deenergize and stop traverse motor 247a. During the traverse of dough former 144 the raised section of cam C4 is in engagement with switch arm S4a to maintain switch S4 open and prevent, during the traverse period, the energization of relay solenoid RS and hence motor 211 and the motivation of the transfer cycle. It should be noted that rheostat P adjusts the current to motor 151 and hence the reciprocation rate of plunger 157 to permit adjustment thereof for different viscosities of dough and other variables. Furthermore, the stop position of plunger 157 is set by means of cam C9 so as to compensate for the rest period and provides a first dough ring of each cycle of same dimensions as the other dough rings formed during the cycle.

During the transfer rest period or cooking period the depressed section of cam C1 engages switch arm S1a to maintain switch S1 closed and timer T advancing to establish the preset interval. During the transfer cycle, with the rotation of cam C1 a raised section of cam C1 engages switch arm S1a momentarily to open switch S1 and the circuit to timer terminal T10 whereby to reset timer T to its zero position, the interval timing commencing with the closing of switch S1. The timer T may be reset as above at any time during the transfer cycle, for example upon retraction of tray member 68. If, for any reason, it is desired to effect the production of dough rings independently of the operation of the apparatus, switch S8 is momentarily closed to energize motor 151 which rotates cam C9 and reciprocate the plunger 157, cam C9 and switch S9 assuring a full stroke of the plunger as described above.

When the dough pieces are to be deposited into cooking vessel 23 from trays, as in the case of the production of yeast-raised doughnuts, the dough former 144 is disabled by opening switch S7 and the traverse mechanism is disabled by opening switch S14, dough former 144 resting in its fully retracted position. At any suitable time before the transfer cycle a dough piece-carrying tray M is positioned on support plates 191 between plates 197 and in engagement with clips 196. Just before the retraction of tray member 68, transfer arms 164 and 178 are simultaneously rocked rearwardly to an advanced position and forwardly to a retracted position by sector gear 212, pinion 222a and the coupling assembly in the manner described above. As arm 164 advances, follower 174 engages the top cam defining face of bracket plate 56 and swings crank arm 172 upwardly to swing the plates 191 and tray M upwardly to a position overlying the trailing part of cooking vessel 23, the pieces of dough carried by tray M being discharged into the cooking vessel. The tray discharge assembly is then retracted, support plates 191, tray M and the related components swinging back to their initial rest positions. The depleted tray M is then removed and replaced by a full tray. In all other respects the operation of the apparatus is similar to that described above.

In FIGURE 15 of the drawings there is illustrated a table and chart showing one sequence and timing of the components of the subject apparatus. It should be noted that since the movement of the icing tray is at the termination of the cycle its rest or drain position may be readily adjusted by adjusting cam C2. Furthermore, since the relationship and configuration of the various cam units are easily adjustable the corresponding operational parameters may be adjusted.

While there has been described and illustrated a preferred embodiment of the present invention it is apparent that numerous alterations, omissions and additions may be made without departing from the spirit thereof.

We claim:

1. A comestible cooking apparatus comprising a cooking vessel, means for advancing a plurality of longitudinally spaced comestibles an increment along a longitudinal path extending through said vessel for a predetermined cycle, and means for regularly periodically intermittently initiating actuation of said rocking means for said cycle at at a predetermined interval independently of said advancing means.

2. A comestible cooking apparatus comprising a cooking vessel, means for advancing a plurality of longitudinally spaced comestibles an increment along a longitudinal path extending through said vessel for a predetermined cycle, means for regularly periodically intermittently initating actuation of said advancing means for said cycle at a predetermined interval, and means for adjusting said interval independently of said advancing means.

3. A material handling apparatus comprising a plurality of longitudinally-spaced transversely-extending tray members swingable about respective transverse axes, means for rearwardly sequentially rocking said trays between forward advanced and retracted positions for a predetermined cycle, and means for regularly periodically initiating actuation of said rocking means for said cycle at a predetermined interval independent of said rocking means.

4. A material handling apparatus comprising a plurality of longitudinally-spaced transversely-extending tray members swingable about respective transverse axes, means for rearwardly sequentially rocking said trays between forward advanced and retracted positions for a predetermined cycle, means for regularly periodically initiating actuation of said rocking means for said cycle at a predetermined interval, and means for adjusting said interval independently of said rocking means.

5. A material handling apparatus comprising a plurality of longitudinally-spaced transversely-extending tray members swingable about respective transverse axes, means for rearwardly sequentially rocking said trays between forward advanced positions overlying the next forward successive tray and rearward retracted positions for a predetermined cycle, means for regularly periodically initiating actuation of said rocking means for said cycle at a predetermined interval, and means for adjusting said intervals independently of said oscillating means.

6. A comestible cooking apparatus comprising a longitudinally-extending cooking vessel, a pair of longitudinally-spaced leading and trailing tray members, means supporting said leading tray member for rocking about a transverse axis between a retracted depressed position within said cooking vessel and an advanced raised discharge position, means supporting said trailing tray member for rocking about a transverse axis between a retracted depressed position within said cooking vessel and trailing said leading tray member and an advanced raised discharge position above the retracted leading tray member, means for depositing comestibles to be cooked into the area of said retracted trailing tray member, means for regularly periodically effecting at a predetermined interval the sequential rocking of said leading and trailing tray members and the actuation of said depositing means whereby sequentially to discharge comestibles from said leading tray member and transfer and invert comestibles from said retracted leading tray member and deposit comestibles into the area of said retracted trailing tray member, and means for adjusting said predetermined interval independently of the period of said sequence.

7. A comestible cooking apparatus comprising a longitudinally-extending cooking vessel, a pair of longitudinally-spaced leading and trailing tray members, means supporting said leading tray member for rocking about a transverse axis between a retracted depressed position within said cooking vessel and an advanced raised discharge position, means supporting said trailing tray member for rocking about a transverse axis between a retracted depressed position within said cooking vessel and trailing said leading tray member and an advanced raised discharge position above the retracted leading tray member, a sector gear, means for intermittently periodically rotating said sector gear at predetermined intervals, a pair of pinion gears peripherally spaced along the path of said sector gear for successive engagement thereby, each of said pinion gears having the same number of teeth as said sector gear, means connecting each of said pinion gears to a corresponding of said tray members whereby successively to rock said tray members with the rotation of said respective pinion gears sequentially to discharge comestibles from said leading tray member and transfer and invert comestibles from said trailing tray member into the area of said retracted leading tray member, and means for adjusting said predetermined interval independently of the period of said sequence.

8. A comestible cooking apparatus comprising a longitudinally-extending cooking vessel, a pair of longitudinally-spaced leading and trailing tray members, means supporting said leading tray member for rocking about a transverse axis between a retracted depressed position within said cooking vessel and an advanced raised discharge position, means supporting said trailing tray member for rocking about a transverse axis between a retracted depressed position within said cooking vessel and trailing said leading tray member and an advanced raised discharge position above the retracted leading tray member, a sector gear, means for intermittently periodically rotating said sector gear at predetermined intervals, a pair of pinion gears peripherally spaced along the path of said sector gear for successive engagement thereby, each of said pinion gears having the same number of teeth as said sector gear, means connecting each of said pinion gear to a corresponding of said tray members whereby successively to rock said tray members with the rotation of said respective pinion gears sequentially to discharge comestibles from said leading tray member and transfer and invert comestibles from said trailing member into said retracted leading tray member, and means for adjusting said predetermined interval independently of the period of said sequence.

9. The apparatus of claim 6, wherein said sequential rocking means comprises an electric motor and motion translating means including a torque limiting coupling connecting said electric motor to said tray members.

10. The apparatus of claim 6, wherein said sequential rocking means includes an electric drive motor, means for energizing said electric motor at said predetermined intervals, and means responsive to a predetermined point in said sequence for deenergizing said motor.

11. The apparatus of claim 6, wherein said comestible-depositing means comprises a dough piece extruder having a downwardly-directed nozzle disposed above said retracted trailing tray member, means for reciprocating said extruder transversely across said cooking vessel, means for effecting said extruder reciprocation upon the retraction of said trailing tray member, and means for actuating said extruder when in registry with said cooking vessel.

12. The apparatus of claim 11, including means for disabling said rocking means responsive to the positioning of said extruder along said traverse stroke.

13. The apparatus of claim 6, wherein said comestible-depositing means comprises a bracket for releasably supporting a feed tray in a retracted position above and forward of the leading end of said cooking vessel, means for rearwardly advancing and retracting said bracket, and means for turning said bracket and said feed tray when said bracket is in its advanced position to discharge comestibles carried by said feed tray into the trailing section of said cooking vessel.

14. An apparatus for the production of fried cakes comprising a longitudinally-extending open-topped cooking vessel, an open-topped icing vessel positioned forwardly of said cooking vessel, a first tray member rockably supported about a transverse axis for oscillation between a retracted depressed position within said icing vessel and an advance position above the leading edge of said icing vessel, a second tray member rockably supported about a transverse axis for oscillation between a retracted horizontally-extending depressed position between the adjacent ends of said icing and cooking vessels and an advanced position projecting upwardly above said icing vessel, a third tray member rockably supported about a transverse axis for oscillation between a retracted depressed position disposed in the leading section of said cooking vessel and an advanced position projecting upwardly over said retracted second tray member, a fourth tray member rockably supported about a transverse axis between a retracted depressed position disposed in the trailing section of said cooking vessel and an advanced position projecting upwardly over said retracted third tray member, a sector gear having a predetermined number of teeth, a plurality of pinion gears peripherally disposed along the path of and adapted to successively engage said sector gear and each having said predetermined number of teeth, a connecting rod and crank mechanism connecting successive of said tray members to respective successive of said pinion gears whereby successively to rock said tray members, an electric motor in driving coupling with said sector gear, timing means for periodically energizing said motor at a predetermined interval, and means responsive to a single rotation of said sector gear for deenergizing said motor.

15. The apparatus of claim 14, wherein said second, third and fourth tray members are in their fully retracted positions when said motor is deenergized, and said first tray member is between its advanced and retracted position above the liquid level in said icing vessel.

16. The apparatus of claim 14, wherein said pinion gears connected to said first and second tray members, and said pinion gears connected to said second and third tray members are in respective overlapping engagement with said sector gear.

17. The apparatus of claim 14, wherein the peripheral spacing of said pinion gears connected to said third and fourth tray members along the direction of advance of said sector gear is greater then the length of said sector gear.

18. The apparatus of claim 14, including an overload clutch disposed between said electric motor and said sector gear.

19. The apparatus of claim 14, wherein the interval of said timing means is adjustable.

20. The apparatus of claim 14, including means responsive to the position of said sector gear for initiating said timing interval.

21. The apparatus of claim 14, including a dough piece extruder, means supporting said dough piece extruder for movement along a transverse path across the trailing section of said cooking vessel, and means responsive to a predetermined position of said sector gear for advancing said extruder along said transverse path.

22. The apparatus of claim 21, including means for preventing the energization of said drive motor during the advance of said extruder.

23. The apparatus of claim 14, including an upwardly directed arm swingable about a transverse axis between an advanced and a retracted position, a replaceable tray-supporting bracket mounted on said arm and disposed forward of said cooking vessel when said arm is in a retracted position and disposed above said cooking vessel when said arm is in its advanced position, means for turning said bracket forwardly as said bracket approaches said advance position, another pinion gear disposed in the path of said sector gear forward of said pinion gear connected to said fourth tray member, and motion translating means connecting said arm to said other pinion gear for actuating said arm upon the retraction of said fourth tray member.

24. An apparatus for the production of fried cakes comprising a longitudinally-extending open-topped cooking vessel, an open-topped icing vessel positioned forwardly of said cooking vessel, a first tray member rockably supported about a transverse axis for oscillation between a retracted depressed position within said icing vessel and an advanced position above the leading edge of said icing vessel, a second tray member rockably supported about a transverse axis for oscillation between a retracted horizontally-extending depressed position between the adjacent ends of said vessels and an advanced position projecting upwardly above said icing vessel, a third tray member rockably supported about a transverse axis for oscillation between a retracted depressed position disposed in the leading section of said cooking vessel and an advanced position projecting upwardly over said retracted second tray member, a fourth tray member rockably supported about a transverse axis between a retracted depressed position disposed in the trailing section of said cooking vessel and an advanced position projecting upwardly over said retracted third tray member, means for successively rocking said tray members in a predetermined sequence, drive means for motivating said rocking, means to effect said predetermined sequence, means for periodically actuating said drive means at predetermined intervals, and means for varying said intervals independently of said tray oscillating sequence.

25. A comestible cooking apparatus comprising a cooking vessel, means for advancing a comestible along said cooking vessel from the rear to the front thereof, means for releasably supporting a tray in a retracted position forward and above said cooking vessel, and means for advancing said tray supporting means toward the rear of said cooking vessel and swinging said tray rearwardly to discharge comestibles carried thereby into the rear section of said cooking vessel.

References Cited by the Examiner

UNITED STATES PATENTS

| | | | |
|---|---|---|---|
| 2,057,639 | 10/1936 | Bergner | 99—405 |
| 2,067,849 | 1/1937 | Hunter | 99—354 X |
| 2,160,123 | 5/1939 | Carpenter | 99—354 |
| 2,894,482 | 7/1959 | Gorham | 134—58 X |
| 2,936,698 | 5/1960 | Giles | 99—354 |
| 3,022,722 | 2/1962 | Arvan | 99—354 |
| 3,124,058 | 3/1964 | Elston | 99—354 |
| 3,165,108 | 1/1965 | Elliott et al. | 134—58 |
| 3,215,062 | 11/1965 | Frankenberg | 99—353 |

BILLY J. WILHITE, *Primary Examiner.*